(12) United States Patent
Smith et al.

(10) Patent No.: US 12,478,340 B2
(45) Date of Patent: Nov. 25, 2025

(54) SYSTEMS AND METHODS FOR PULMONARY PERFUSION ANALYSIS USING DYNAMIC RADIOGRAPHY

(71) Applicant: VANDERBILT UNIVERSITY, Nashville, TN (US)

(72) Inventors: Matthew Smith, Nashville, TN (US); Gary T. Smith, Nashville, TN (US); Jared Grice, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 274 days.

(21) Appl. No.: 18/278,582

(22) PCT Filed: Feb. 26, 2022

(86) PCT No.: PCT/US2022/018045
§ 371 (c)(1),
(2) Date: Aug. 23, 2023

(87) PCT Pub. No.: WO2022/183082
PCT Pub. Date: Sep. 1, 2022

(65) Prior Publication Data
US 2024/0138795 A1   May 2, 2024

Related U.S. Application Data

(60) Provisional application No. 63/154,244, filed on Feb. 26, 2021.

(51) Int. Cl.
*A61B 6/50*   (2024.01)
*A61B 6/00*   (2024.01)
(Continued)

(52) U.S. Cl.
CPC .............. *A61B 6/507* (2013.01); *A61B 6/032* (2013.01); *A61B 6/482* (2013.01); *A61B 6/487* (2013.01);
(Continued)

(58) Field of Classification Search
CPC ......... A61B 6/507; A61B 6/032; A61B 6/482; A61B 6/487; A61B 6/504; A61B 5/02;
(Continued)

(56) References Cited

U.S. PATENT DOCUMENTS 6,522,720 B1   2/2003   Kiuru et al.
9,947,093 B2   4/2018   Tsunomori et al.
(Continued)

FOREIGN PATENT DOCUMENTS

WO   2020/126764 A1   6/2020

OTHER PUBLICATIONS

Tanaka, Rie, et al. "Comparison of dynamic flat-panel detector-based chest radiography with nuclear medicine ventilation-perfusion imaging for the evaluation of pulmonary function: a clinical validation study." Medical Physics 47.10 (2020): 4800-4809.
(Continued)

*Primary Examiner* — Siamak Harandi
(74) *Attorney, Agent, or Firm* — Meunier Carlin & Curfman LLC

(57) ABSTRACT

Described herein are systems, methods, and computer-readable medium for detecting a perfusion abnormality of a subject. In one embodiment, a method includes the following: obtaining, by dynamic radiography, imaging data for a dynamic series of a plurality of x-ray images that include areas of a subject corresponding to pulmonary vasculature; identifying, based on the imaging data, a dynamic signal corresponding to changing blood volume during the cardiac
(Continued)

cycle of the subject; decomposing the dynamic signal into periodic components in frequency space; identifying, from the periodic components in frequency space, signals oscillating at the heart rate of the subject; generating, based on the identified signals oscillating at the heart rate of the subject, a perfusion map representation corresponding to pulmonary tissue perfusion in the subject; and detecting, based at least in part on the generated perfusion map representation, a perfusion abnormality of the subject.

12 Claims, 5 Drawing Sheets

(51) Int. Cl.
*A61B 6/03* (2006.01)
*G06T 7/00* (2017.01)
*G06T 11/00* (2006.01)
*G06T 11/20* (2006.01)
*G16H 30/40* (2018.01)
*G16H 50/20* (2018.01)

(52) U.S. Cl.
CPC ............ *A61B 6/504* (2013.01); *G06T 7/0012* (2013.01); *G06T 11/001* (2013.01); *G06T 11/206* (2013.01); *G16H 30/40* (2018.01); *G16H 50/20* (2018.01); *G06T 2200/04* (2013.01); *G06T 2207/10016* (2013.01); *G06T 2207/10081* (2013.01); *G06T 2207/10121* (2013.01); *G06T 2207/20056* (2013.01); *G06T 2207/30061* (2013.01); *G06T 2207/30104* (2013.01); *G06T 2210/41* (2013.01)

(58) Field of Classification Search
CPC ....... A61B 5/055; A61B 6/486; A61B 6/5217; G06T 7/0012; G06T 11/001; G06T 11/206; G06T 2200/04; G06T 2207/10016; G06T 2207/10081; G06T 2207/10121; G06T 2207/20056; G06T 2207/30061; G06T 2207/30104; G06T 2210/41; G06T 7/0016; G16H 30/40; G16H 50/20
See application file for complete search history.

(56) References Cited

U.S. PATENT DOCUMENTS

| | | | |
|---|---|---|---|
| 10,149,658 | B2 | 12/2018 | Tsunomori et al. |
| 10,242,445 | B2 | 3/2019 | Tsunomori et al. |
| 10,679,356 | B2 | 6/2020 | Muraoka et al. |
| 10,687,772 | B2 | 6/2020 | Futamura et al. |
| 2013/0281830 | A1 | 10/2013 | Patz et al. |
| 2014/0163368 | A1 | 6/2014 | Rousso et al. |
| 2017/0186195 | A1 | 6/2017 | Lin et al. |
| 2019/0150764 | A1* | 5/2019 | Arnold ................... G06V 10/82 |
| 2019/0159744 | A1* | 5/2019 | Mensah ................. G16H 50/30 |

OTHER PUBLICATIONS

Tanaka, Rie, et al. "Detection of pulmonary embolism based on reduced changes in radiographic lung density during cardiac beating using dynamic flat-panel detector: an animal-based study." Academic Radiology 26.10 (2019): 1301-1308.

Tanaka, Rie, Hiroaki Matsuda, and Shigeru Sanada. "Time-series analysis of lung texture on bone-suppressed dynamic chest radiograph for the evaluation of pulmonary function: a preliminary study." Medical Imaging 2017: Biomedical Applications in Molecular, Structural, and Functional Imaging. vol. 10137. SPIE, 2017.

Tanaka, Rie. "Dynamic chest radiography: flat-panel detector (FPD) based functional X-ray imaging." Radiological physics and technology 9.2 (2016): 139-153.

Tanaka, Rie, et al. "Development of pulmonary blood flow evaluation method with a dynamic flat-panel detector: quantitative correlation analysis with findings on perfusion scan." Radiological physics and technology 3 (2010): 40-45.

Silverman, N. R., et al. "Determination of pulmonary pulsatile perfusion by fluoroscopic videodensitometry." Journal of Applied Physiology 33.1 (1972): 147-149.

Matt Smith, et al., Lung Perfusion with Fluoroscopy Using Fourier Analysis. Poster76, 2021. 7 pages.

Liang, Jianming, et al. "Dynamic chest image analysis: evaluation of model-based ventilation study with pyramid images." 1997 IEEE International Conference on Intelligent Processing Systems (Cat. No. 97TH8335). vol. 2. IEEE, 1997.

International Preliminary Report on Patentability dated Sep. 7, 2023.

International Search Report and Written Opinion received in PCT/US2022/018045 mailed May 16, 2022.

Zhao et al. Dynamic pulmonary CT perfusion using first-pass analysis technique with only two volume scans: Validation in a swine model. Feb. 12, 2020 (Feb. 12, 2020}. [retrieved on Apr. 25, 2022]. Retrieved from the Internet: <URL: https:/{journals.plos.org/plosone/article/file? id= 10.1371~oumal.pone.022811 0&type= printable> pp. 1-16.

Niedbalski et al. Mapping cardiopulmonary dynamics within the microvasculature of the lungs using dissolved 129Xe MRI. Jun. 18, 2020 {Jun. 18, 2020). [retrieved on Apr. 25, 2022]. Retrieved from the Internet: <URL ~ttps:/{journals.physiology .org/doi/pdfplus/10. 1152{j~pplphysiol.00186.2020> pp. 218-229.

Bondesson et al. Nonuniform Fourier-decomposition MRI for ventilation- and perfusion-weighted imaging of the lung. May 20, 2019 (May 20, 2019). [retrieved on Apr. 25, 2022}. Retrieved from the Internet: <URL: https://onlinelibrary.wiley,com/doi/pdfdirecV10,1002/mrm.27803> pp. 1312-1321.

\* cited by examiner

SYSTEMS AND METHODS FOR PULMONARY PERFUSION ANALYSIS USING DYNAMIC RADIOGRAPHY

CROSS-REFERENCE TO RELATED APPLICATIONS

This application is a national stage application filed under 35 U.S.C. § 371 of PCT/US2022/018045 filed Feb. 26, 2022, which claims the benefit of and priority to U.S. Provisional Application No. 63/154,244 filed Feb. 26, 2021. These applications are hereby incorporated by reference in their entireties.

BACKGROUND

Pulmonary embolism (PE) is an emergent condition that can cause rapid clinical deterioration. Current methods to evaluate for pulmonary embolism (PE) in the lungs include computerized tomography angiography (CIA) or pulmonary scintigraphy (V/Q scan). PE evaluated by CIA can be expensive and involves a non-negligible radiation dose. Many parts of the world lack the resources needed for CTA (e.g., a CT scanner). CTA also it requires intravenous injection of iodinated contrast. Also, there are certain categories of patients that are not able to use CTA (e.g., young patients, pregnant patients, or those with poor kidney function), who may be evaluated through the use of a nuclear medicine tracer study in the form of the V/Q scan. However, a V/Q scan also introduces a non-negligible radiation dose and the facility to administer it needs to have the anility to produce or store a radiotracer.

It is with respect to these and other considerations that the various aspects of the present disclosure as described below are presented.

SUMMARY

In one aspect, the present disclosure relates to a method for detecting a perfusion abnormality of a subject. In one embodiment, the method includes: obtaining, by dynamic radiography, imaging data for a dynamic series of a plurality of x-ray images that include areas of a subject corresponding to pulmonary vasculature; identifying, based on the imaging data, a dynamic signal corresponding to changing blood volume during the cardiac cycle of the subject; decomposing the dynamic signal into periodic components in frequency space; identifying, from the periodic components in frequency space, signals oscillating at the heart rate of the subject generating, based on the identified signals oscillating at the heart rate a the subject, a perfusion map representation corresponding to pulmonary tissue perfusion in the subject; and detecting, based at least in part on the generated perfusion map representation, a perfusion abnormality of the subject.

In another aspect, the present disclosure relates to a method for detecting a perfusion abnormality of a subject, which, in one embodiment, includes obtaining, by dynamic radiography using a CT scanner, imaging data of three-dimensional dynamic x-ray images that include areas of the subject which correspond to pulmonary vasculature. The imaging data includes a plurality of voxels. The method also includes: identifying, from the obtained imaging data, a dynamic signal corresponding to each of the plurality of voxels; decomposing, on a voxel-by-voxel basis, the respective dynamic signal into periodic components that correspond to periodic signals in frequency space; identifying, from the periodic components, the magnitude of signal oscillating at the heart rate; generating, based on the identified magnitude of signal, a three-dimensional perfusion wrap representation; and detecting, based at least in part on the generated perfusion map representation, a perfusion abnormality of the subject.

In another aspect, the present disclosure relates to a system for detecting a perfusion abnormality of a subject. In one embodiment, the system includes: a dynamic radiography device configured to obtain imaging data for a dynamic series of a plurality of x-ray images that include areas of a subject corresponding to pulmonary vasculature; and one or more processors. The system also includes a memory coupled to at least the one or more processors that stores instructions which, when executed by a computer, cause the system to perform specific functions. The specific functions include: identifying, based on the imaging data, a dynamic signal corresponding to changing blood volume during the cardiac cycle of the subject; decomposing the dynamic signal into periodic components in frequency space; identifying, from the periodic components in frequency space, signals oscillating at the heart rate of the subject; generating, based on the identified signals oscillating at the heart rate of the subject, a perfusion map representation corresponding to pulmonary tissue perfusion in the subject; and detecting, based at least in part on the generated perfusion map representation, a perfusion abnormality of the subject.

In another aspect, the present disclosure relates to a system for detecting a perfusion abnormality of a subject which, in one embodiment, includes a computerized tomography (CT) scanner configured to obtain imaging data of three-dimensional dynamic x-ray images that include areas of the subject which correspond to pulmonary vasculature. The imaging data includes a plurality of voxels. The system also includes one or more processors and a memory coupled to at least the one or more processors that stores instructions which, when executed by a computer, cause the system to perform specific functions. The specific instructions include: identifying, from the obtained imaging data, a dynamic signal corresponding to each of the plurality of voxels; decomposing, on a voxel-by-voxel basis, the respective dynamic signal into periodic components that correspond to periodic signals in frequency space; identifying, from the periodic components, the magnitude of signal oscillating at the heart rate; generating, based on the identified magnitude of signal, a three-dimensional perfusion map representation; and detecting, based at least in part on the generated perfusion map representation, a perfusion abnormality of the subject.

In another aspect, the present disclosure relates to a non-transitory computer-readable medium storing instructions which, when executed by a computer, cause a dynamic radiography system to perform specific functions. In one embodiment, the functions include: obtaining imaging data for a dynamic series of a plurality of x-ray images that include areas of a subject corresponding to pulmonary vasculature; identifying, based on the imaging data, a dynamic signal corresponding to changing blood volume during the cardiac cycle of the subject; decomposing the dynamic signal into periodic components in frequency space; identifying, from the periodic components in frequency space, signals oscillating at the heart rate of the subject; generating, based on the identified signals oscillating at the heart rate of the subject, a perfusion map representation corresponding to pulmonary tissue perfusion in the subject; and detecting, based at least in part on the generated perfusion map representation, a perfusion abnormality of the subject.

In another aspect, the present disclosure relates to a non-transitory computer-readable medium storing instructions. In one embodiment, when executed by a computer, the instructions cause a dynamic radiography system comprising a computerized tomography (CT) scanner to perform functions that include: obtaining imaging data of three-dimensional dynamic x-ray images that include areas of the subject which correspond to pulmonary vasculature, and wherein the imaging data includes a plurality of voxels, identifying, from the obtained imaging data, a dynamic signal corresponding to each of the plurality of voxels; decomposing, on a voxel-by-voxel basis, the respective dynamic signal into periodic components that correspond to periodic signals in frequency space identifying, from the periodic components, the magnitude of signal oscillating at the heart rate; generating, based on the identified magnitude of signal, a three-dimensional perfusion map representation; and detecting, based at least in part on the generated perfusion map representation, a perfusion abnormality of the subject.

Other aspects and features according to the example embodiments of the disclosed technology will become apparent to those of ordinary skill in the art, upon reviewing the following detailed description in conjunction with the accompanying figures.

BRIEF DESCRIPTION OF THE DRAWINGS

Reference will now be made to the accompanying drawings, which are not necessarily drawn to scale.

DETAILED DESCRIPTION

Figure 1A:
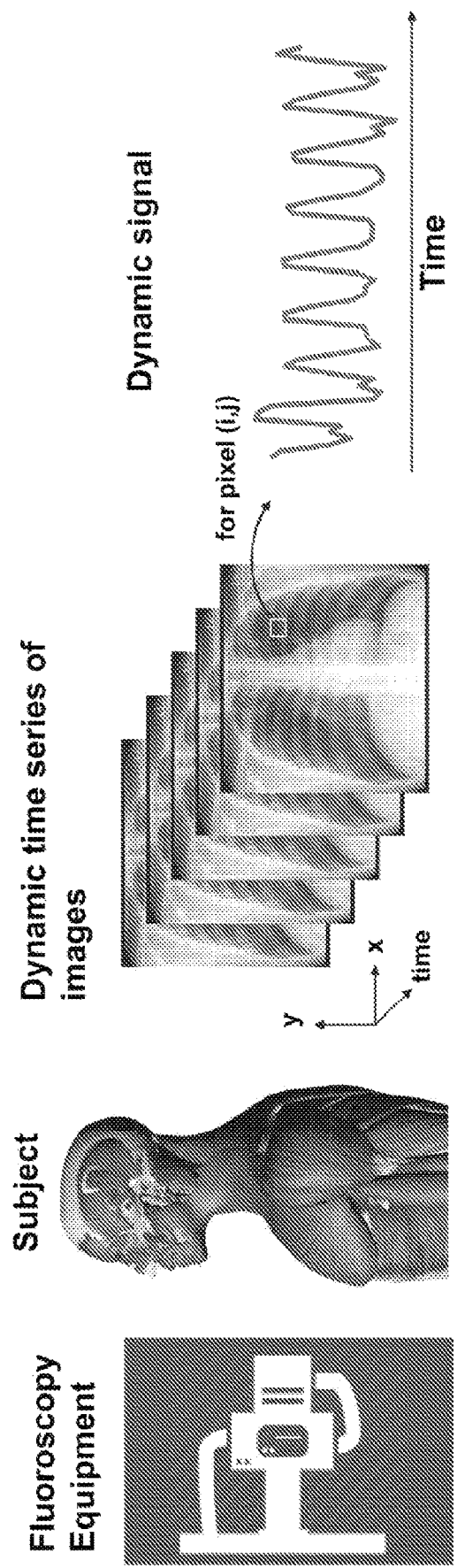
FIGS. 1A and 1B show a flow diagram illustrating operations of a method for detecting a perfusion abnormality in accordance with an embodiment of the present disclosure.

In some aspects, the disclosed technology relates to perfusion analysis using dynamic radiography. Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

As discussed herein, a "subject" (or "patient") may be any applicable human, animal, or other organism and may relate to particular components of the subject, for instance specific organs, tissues, or fluids of a subject, and may be in a particular location of the subject, referred to herein as an "area of interest" or a "region of interest," For example, as shown in FIG. 1A, pulmonary vasculature of a "subject" is being evaluated through the use of fluoroscopy equipment (dynamic radiology equipment using x-ray units, etc.).

A detailed description of aspects of the disclosed technology, in accordance with various example embodiments, will now be provided with reference to the accompanying drawings. The drawings form a part hereof and show, by way of illustration, specific embodiments and examples. In referring to the drawings, like numerals represent like elements throughout the several figures.

Among other numerous benefits provided, certain embodiments of the present disclosure can provide pulmonary perfusion information for the detection of perfusion abnormalities in the lungs. For example, some implementations of the present disclosure provide for the detection of a perfusion defect such as a pulmonary embolism (PE), but without the need for expensive CTA or V/Q equipment, without the need for an IV contrast agent, and with less radiation dose to the subject.

Now referring to FIG. 1A, many standard x-ray units are capable of dynamic x-ray procedures, or fluoroscopy. This approach may generally be referred to herein as "dynamic radiography" or may also be referred to as "video fluoroscopy." For example, see "fluoroscopy equipment" labeled in FIG. 1A. According to some embodiments of the present disclosure, a dynamic radiography system is used to obtain a dynamic series of x-ray images for a subject, over time for a particular period of time, and it is obtained at particular frame rate (see "Dynamic time series of images" in FIG. 1A). For each pixel of the image, the signal is obtained and can be tracked through time as a dynamic signal using the dynamic series of images (see, e.g., "Dynamic signal" in FIGS. 1A and 1B). Each pixel (i, j) can represent a respective point of a particular anatomical area of the subject, for example a single piece of tissue in the lungs of a subject.

The amount of blood in the pulmonary vasculature is not constant throughout the cardiac cycle. During systole, the right ventricle ejects blood into the pulmonary arteries. The increased pulmonary blood volume during systole increases x-ray attenuation during systole. Fluoroscopy of the lungs can demonstrate a small dynamic signal (see FIGS. 1A and 1B, "Dynamic signal") that oscillates at the same frequency as the heart beating, corresponding to the changing blood volume during the cardiac cycle.

Figure 1B:
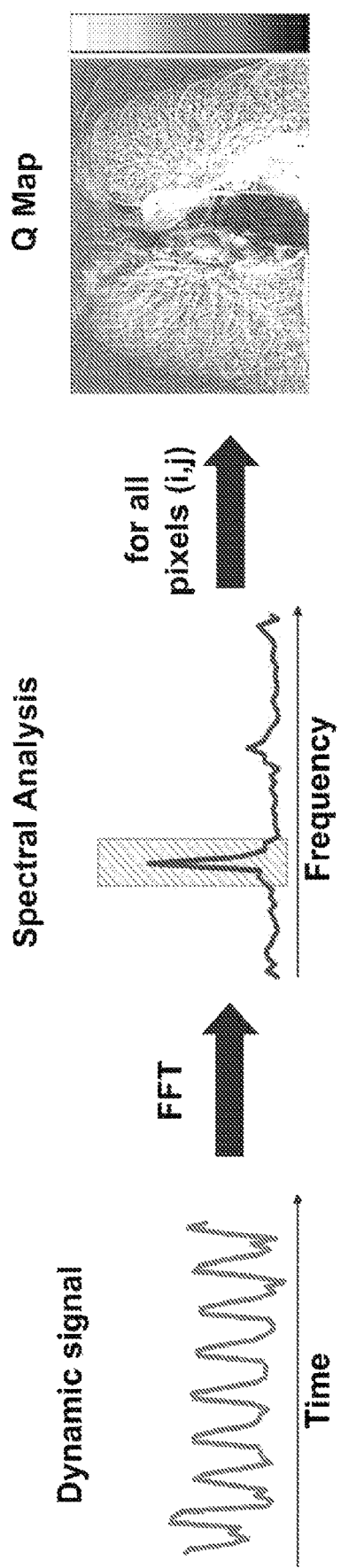

The dynamic signal can be decomposed into periodic components. In some embodiments, the dynamic signal can be converted into sinusoidal signals in frequency space, through Fourier transform-based processing. FIG. 1B (continuation of FIG. 1A) shows "Fourier processing" of the "Dynamic signal". For example, the dynamic signal can be converted using a Fourier Transform according to:

$$S_x(f) = \int x(t)e^{-j2\pi ft}dt$$

Thus, a time dependent transmission signal x(t) is converted into a combination of periodic signals with magnitude and phase. In accordance with some embodiments of the present disclosure, once the signal is decomposed into periodic signals, then the signal oscillating at the heart rate can be isolated from the rest of the signal (noise). A perfusion map representation (see, e.g., FIG. 4) can be produced that represents the magnitude of signal oscillating at the heart rate of the subject. Notably, most subjects have a heart rate of about 60-110 beats per minute. In some implementations, nonperfused tissue distal to a blood clot in the lungs (pulmonary embolism) will not display this periodic signal, and therefore perfusion defects can thereby be identified.

As mentioned in some detail above, whereas conventional approaches may analyze a signal in the time dimension, the present inventors have recognized that the periodicity of the pulmonary vasculature signal lends itself well to a spectral analysis using a Fourier-based approach which converts the periodic signal into multiple frequency components. The frequencies can be filtered/binned to identify signals varying at the heart rate. The Fourier-based approach provides a mathematically complex result. The magnitude component can be used to indicate the amount of perfusion, but the phase component corresponds to a time delay. This phase signal can therefore provide an indication of a time delay between the cardiac contraction and blood flow to the lungs, which may be a surrogate for pulmonary vascular resistance.

The x-ray signal for a particular cluster of pixels may be selected and a Fourier transform can be performed for each pixel of the cluster of pixels. For purposes of generating a perfusion map representation of the entire area of the subject that is being imaged, a Fourier transform can be performed for every pixel in each image of the above-discussed dynamic time series of images. The signal may can be extracted for a particular frequency that corresponds to the heart rate.

Figure 2:
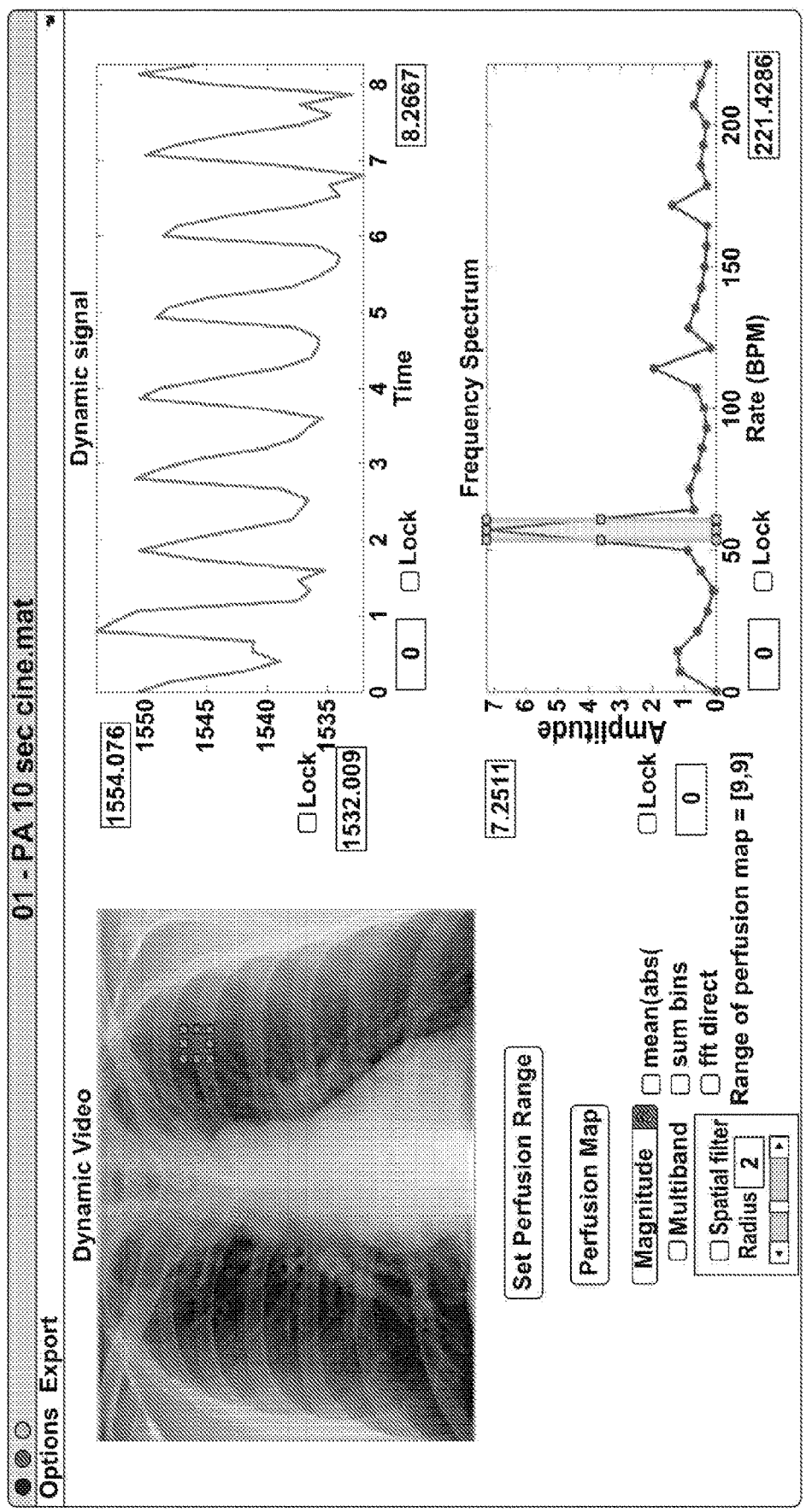
FIG. 2 is a screen shot showing: video fluoroscopy images (top left) of an area of a subject that includes the lungs; a dynamic signal in time that corresponds to image data obtained through the video fluoroscopy (top right); and a signal in frequency space (bottom right) resulting from processing of the dynamic time signal using a Fourier transform. The screen shot of FIG. 2 also illustrates, as part of a user interface, a bounded region surrounding a peak signal area, demonstrating filtering of portions of the signal to be used in generating a perfusion snap representation (see, for instance, final "Q Map" in FIG. 1B and the perfusion colormap shown in FIG. 4).
Figure 3:
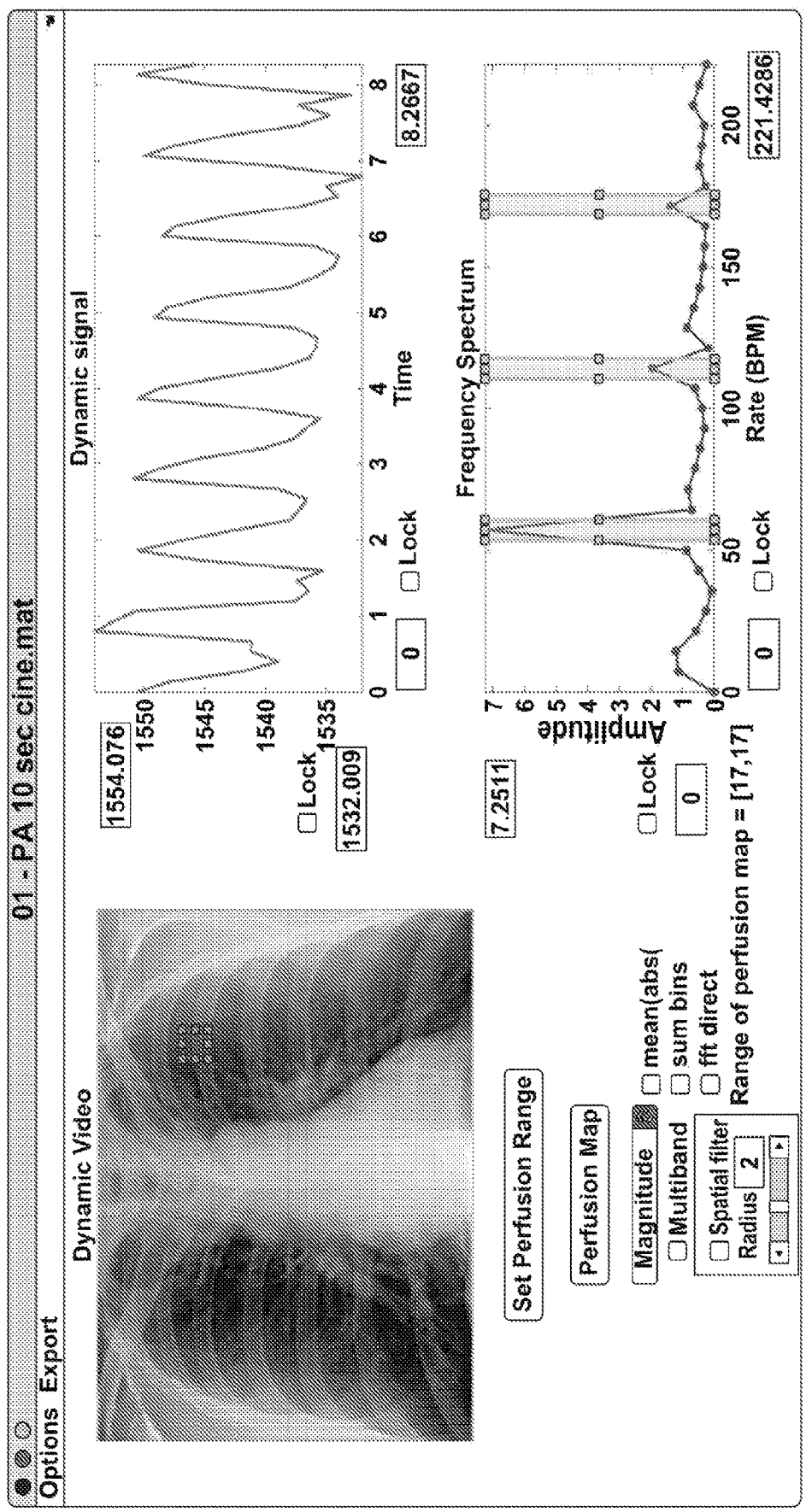
FIG. 3 is a screen shot similar to that of FIG. 2, showing (in the bottom right plot) aspects of multi band filtering to be used in generating a perfusion map representation.

In accordance with certain implementations of the present disclosure, it is desirable to determine the signal oscillating at the heart rate of the subject. A signal peak in frequency space (see, e.g., FIGS. 2 and 3) can be indicative of useful signal information (versus noise). However, since the sampling interval in time is finite (e.g., 7-30 frames per second), there is a spectral width to a particular peak of interest in frequency space. The converted signal in frequency space can be filtered/binned to identify signals oscillating at the heart rate. As shown in the screen shots of FIGS. 2 and 3, in the lower-right illustrative plot labeled "Frequency Spectrum", there is a peak at 57 beats per minute (BPM). This peak is displayed at a particular value along the frequency spectrum, and it is displayed as being bounded by a spectral band (which can be considered a band-pass filter for certain frequencies of the signal). With a graphical user interface, the user can set the width of the spectral band. Each band can correspond to more or less beats per minute (for example, more or less than the width of about BPM shown).

Figure 4:
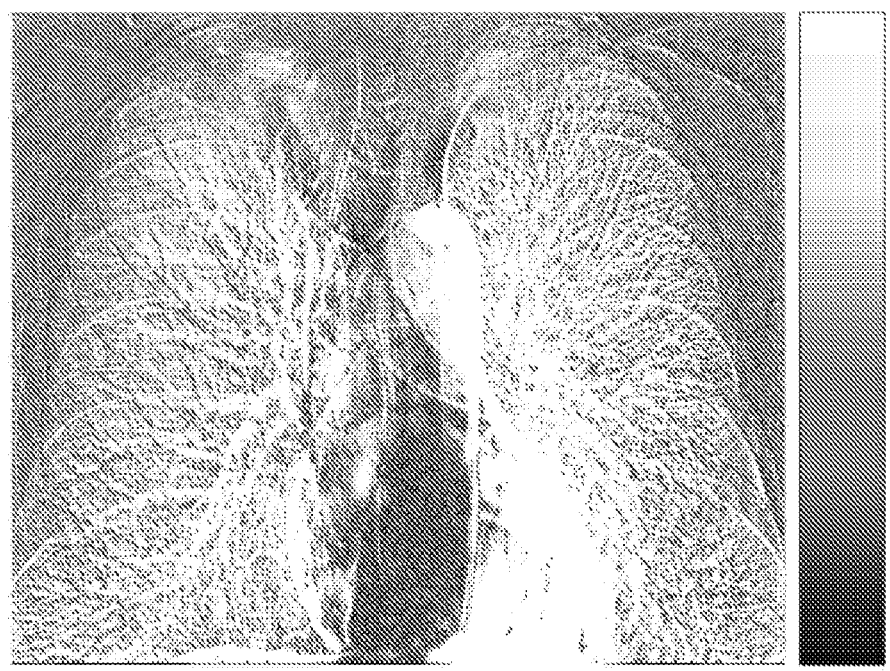
FIG. 4 shows a generated perfusion map representation indicating signal values at various locations in the imaged pulmonary vasculature.

In some embodiments, several discrete frequency bands corresponding to higher order harmonics can be identified and combined in order to construct: the perfusion map representations (such as the map shown in FIGS. 1B and 4). Since the signal in frequency space is not perfect (i.e., not a perfect sinusoid), these higher order ha Ionics can be utilized for improving quality of the reconstructions. For example, as shown in the screen shot of FIG. 3, in the "Frequency Spectrum" plot in the lower right, in addition to the band including the peak mentioned above with respect to FIG. 2, there is also a second harmonic within a selected spectral band that is centered around a peak of 115 BPM (two times the peak frequency), and a third harmonic is also within a spectral band that is centered around a peak of 170 BPM (three times the peak frequency). As such, the implementation shown in FIG. 3 demonstrates an embodiment of the present disclosure that utilizes multi-band filtering. Although certain aspects and embodiments described above are particularly described with respect to exemplary implementations for the lungs, it should be appreciated that the same or similar techniques components thereof) may be utilized in other medical contexts such as in perfusion imaging for the brain or for dynamic imaging of the heart throughout the cardiac cycle.

Methods in accordance with some embodiments of the present disclosure can be extended to computerized tomography (CF), as the method(s) utilize x-ray attenuation of a time-varying blood volume. Fluoroscopy uses the signal from x-ray attenuation to make two-dimensional (2D) images. Standard CT employs a similar principle (i.e., uses x-ray attenuation), but the x-ray source rotates around the patient. Similar principles employed by fluoroscopy for 2D imaging, which uses projection imaging, can be extended to CT when CT is operating with a rotating x-ray source and generates 3D images. Reconstructing the projection data can yield a 3D data set (three spatial dimensions) that can be used clinically. If the CT scan is repeated quickly, a four-dimensional data set can be acquired (3D spatial+1D time).

The benefits of this extension are significant. For example, 3D reconstruction is helpful to localize a perfusion abnormality. Additionally, such techniques can be utilized for perfusion imaging of the brain for strokes or dynamic imaging of the heart throughout the cardiac cycle. Also, current standard of care pathways utilize CT, but some patients cannot receive iodinated IV contrast for a traditional angiogram of the chest. The 3D approaches in accordance with some embodiments of the present disclosure provide 3D imaging capabilities without the need for such a contrast agent.

Whereas a pixel-by-pixel analysis can be performed in fluoroscopy for 2D imaging as described above with respect to some embodiments, a similar analysis may be conducted in three spatial dimensions by a voxel-by-voxel (volume pixel) analysis. In some embodiments, a voxel-by-voxel analysis involves taking the dynamic signal from each voxel, performing a spectral analysis, and identifying the magnitude of signal oscillating at the heart rate to create a 3D map. This 3D map can be similar to the iodine maps currently produced with dual energy CT scans for PE. However, in certain embodiments of the present disclosure, a similar perfusion map can be produced without the need of a contrast agent.

Some CT scanners can be set such that the x-ray source does not rotate when obtaining x-ray images. In this operating mode, when imaging the chest region, certain functions can be performed that is similar to fluoroscopy as described above (i.e., multiple x-ray images obtained over time in a 2D framework). In such an implementation, perfusion maps similar to those described with respect to fluoroscopy or other 2D-oriented dynamic radiology settings may be implemented, without departing from the scope of the present disclosure.

Dual energy techniques may be utilized in accordance with some embodiments of the present disclosure. A dual energy approach can acquire two separate datasets at two different x-ray energies; combining the two datasets enables reconstruction of images representing different materials. Through the use of a dual energy acquisition, the contrast of the blood pool can be enhanced to optimize the signal.

Now described in further detail, a material attenuates (blocks) x-rays differently depending on the energy of the x-rays. X-ray attenuation curves show the relationship with energy. Different materials have different x-ray attenuation curves. For example, blood has a specific attenuation curve that is different from bone or soft tissue, and which can be utilized to optimize the contrast. Dual energy is an x-ray technique that acquires two datasets at different x-ray energies and processes the datasets to reconstruct images at any desired energy level. As an example, if contrast of blood is optimal at 30 keV, then a dataset may be reconstructed at 30 keV using dual energy techniques, which would accentuate the particular desired signal. The dual energy technique can be applied to fluoroscopy (2D) or CT (3D).

Some aspects and implementations of the present disclosure may be performed, at least in part, using a computer. The computer may be configured to perform one or more specific steps of a method and/or specific functions for a system in accordance with embodiments discussed herein. The computer may be configured to perform one or more functions associated with embodiments illustrated in one or more of FIGS. 1-4. For example, the computer may be configured to perform aspects described herein for implementing various aspects of obtaining dynamic radiology data, processing the obtained data, and/or generating a perfusion map representation.

The computer may include a processing unit ("CPU"), a system memory, and a system bus that couples the memory to the CPU. The computer may further include a mass storage device for storing program modules. The program modules may be operable to perform functions described herein with one or more embodiments described herein. For example, when executed, the program modules can cause one or more medical imaging devices and/or computers to perform functions described herein for implementing aspects shown in FIGS. 1-4. The program modules may include an imaging application for performing data acquisition and/or processing functions as described herein, for example to acquire and/or process image data corresponding to x-ray imaging data of an area of interest of a subject. The computer may include a data store for storing data that may include imaging-related data.

The mass storage device may be connected to the CPU through a mass storage controller connected to the bus. The mass storage device and its associated computer-storage media may provide non-volatile storage for the computer. Although the description of computer-storage media contained herein refers to a mass storage device, such as a hard disk, it should be appreciated by those skilled in the art that computer-storage media can be any available computer storage media that can be accessed by the computer.

By way of example and not limitation, computer storage media (also referred to herein as "computer-readable storage medium" or "computer-readable storage media") may include volatile and non-volatile, removable and non-removable media implemented in any method or technology for storage of information such as computer-storage instructions, data structures, program modules, or other data, "Computer storage media", "computer-readable storage medium" or "computer-readable storage media" as described herein do not include transitory signals.

The computer play also include an input/output controller for receiving and processing input from any of a number of input devices. Input devices may include one or more of keyboards, mice, stylus, touchscreens, microphones, audio capturing devices, and image/video capturing devices. An end user may utilize the input devices to interact with a user interface, for example a graphical user interface, for managing various functions performed by the computer. The input/output controller may be configured to manage output to one or more display devices for displaying visually representations of data, such as display monitors/screens that are integral with other components of the computer or are remote displays.

CONCLUSION

The specific configurations, choice of materials and the size and shape of various elements can be varied according to particular design specifications or constraints requiring a system or method constructed according to the principles of the present disclosure. Such changes are intended to be embraced within the scope of the present disclosure. The presently disclosed embodiments, therefore, are considered in all respects to be illustrative and not restrictive. The patentable scope of certain embodiments of the disclosed technology is indicated by the appended claims.

What is claimed is:

1. A method for detecting a perfusion abnormality of a subject, comprising:
   obtaining, by dynamic radiography, imaging data for a dynamic series of a plurality of x-ray images that include areas of a subject corresponding to pulmonary vasculature;
   identifying, based on the imaging data, a dynamic signal corresponding to changing blood volume during the cardiac cycle of the subject;
   decomposing the dynamic signal into periodic components in frequency space;
   identifying, from the periodic components in frequency space, signals oscillating at the heart rate of the subject;

generating, based on the identified signals oscillating at the heart rate of the subject, a perfusion map representation corresponding to pulmonary tissue perfusion in the subject; and detecting, based at least in part on the generated perfusion map representation, a perfusion abnormality of the subject.

2. The method of claim 1, wherein the dynamic series of images is obtained, at least in part, using fluoroscopy and does not require the use of a contrast agent in the subject.

3. The method of claim 1, wherein decomposing the dynamic signal into periodic components comprises using a Fourier transform.

4. The method of claim 1, wherein generating the perfusion map representation comprises generating a colormap that represents an amount of signal oscillating at the heart rate of the subject, based on filtering signals in frequency space.

5. The method of claim 1, wherein generating the perfusion map representation comprises identifying and combining multiple frequency bands.

6. The method of claim 1, wherein detecting the perfusion abnormality comprises determining, from a product of the decomposed dynamic signal, pulmonary resistance associated with a time delay between cardiac contraction and blood flow to the lungs of the subject.

7. The method of claim 1, wherein obtaining the x-ray imaging data further comprises applying a dual energy technique to obtain two datasets associated with the area of the subject that corresponds to the pulmonary vasculature, for two different respective x-ray energies, and reconstructing images at a desired energy level such as to enhance contrast of a blood pool for optimizing signal measurements.

8. A method for detecting a perfusion abnormality of a subject, comprising:
obtaining, by dynamic radiography using a CT scanner, imaging data of three-dimensional dynamic x-ray images that include areas of the subject which correspond to pulmonary vasculature, and wherein the imaging data includes a plurality of voxels;
identifying, from the obtained imaging data, a dynamic signal corresponding to each of the plurality of voxels;
decomposing, on a voxel-by-voxel basis, the respective dynamic signal into periodic components that correspond to periodic signals in frequency space;
identifying, from the periodic components, the magnitude of signal oscillating at the heart rate;
generating, based on the identified magnitude of signal, a three-dimensional perfusion map representation; and
detecting, based at least in part on the generated perfusion map representation, a perfusion abnormality of the subject.

9. A system for detecting a perfusion abnormality of a subject, comprising:
a dynamic radiography device configured to obtain imaging data for a dynamic series of a plurality of x-ray images that include areas of a subject corresponding to pulmonary vasculature;
one or more processors; and
a memory coupled to at least the one or more processors that stores instructions which, when executed by a computer, cause the system to perform functions that include:
identifying, based on the imaging data, a dynamic signal corresponding to changing blood volume during the cardiac cycle of the subject;
decomposing the dynamic signal into periodic components in frequency space;
identifying, from the periodic components in frequency space, signals oscillating at the heart rate of the subject;
generating, based on the identified signals oscillating at the heart rate of the subject, a perfusion map representation corresponding to pulmonary tissue perfusion in the subject; and
detecting, based at least in part on the generated perfusion map representation, a perfusion abnormality of the subject.

10. A system for detecting a perfusion abnormality of a subject, comprising:
a computerized tomography (CT) scanner configured to obtain imaging data of three-dimensional dynamic x-ray images that include areas of the subject which correspond to pulmonary vasculature, and wherein the imaging data includes a plurality of voxels;
one or more processors; and
a memory coupled to at least the one or more processors that stores instructions which, when executed by a computer, cause the system to perform functions that include:
identifying, from the obtained imaging data, a dynamic signal corresponding to each of the plurality of voxels;
decomposing, on a voxel-by-voxel basis, the respective dynamic signal into periodic components that correspond to periodic signals in frequency space;
identifying, from the periodic components, the magnitude of signal oscillating at the heart rate;
generating, based on the identified magnitude of signal, a three-dimensional perfusion map representation; and
detecting, based at least in part on the generated perfusion map representation, a perfusion abnormality of the subject.

11. A non-transitory computer-readable medium storing instructions which, when executed by a computer, cause a dynamic radiography system to perform functions that include:
obtaining imaging data for a dynamic series of a plurality of x-ray images that include areas of a subject corresponding to pulmonary vasculature;
identifying, based on the imaging data, a dynamic signal corresponding to changing blood volume during the cardiac cycle of the subject;
decomposing the dynamic signal into periodic components in frequency space;
identifying, from the periodic components in frequency space, signals oscillating at the heart rate of the subject;
generating, based on the identified signals oscillating at the heart rate of the subject, a perfusion map representation corresponding to pulmonary tissue perfusion in the subject; and
detecting, based at least in part on the generated perfusion map representation, a perfusion abnormality of the subject.

12. A non-transitory computer-readable medium storing instructions which, when executed by a computer, cause a dynamic radiography system comprising a computerized tomography (CT) scanner to perform functions that include:
obtaining imaging data of three-dimensional dynamic x-ray images that include areas of the subject which correspond to pulmonary vasculature, and wherein the imaging data includes a plurality of voxels;

identifying, from the obtained imaging data, a dynamic signal corresponding to each of the plurality of voxels;

decomposing, on a voxel-by-voxel basis, the respective dynamic signal into periodic components that correspond to periodic signals in frequency space;

identifying, from the periodic components, the magnitude of signal oscillating at the heart rate;

generating, based on the identified magnitude of signal, a three-dimensional perfusion map representation; and detecting, based at least in part on the generated perfusion map representation, a perfusion abnormality of the subject.

\* \* \* \* \*